(12) United States Patent
Sivertsen

(10) Patent No.: US 9,110,547 B1
(45) Date of Patent: Aug. 18, 2015

(54) CAPACITANCE SENSING DEVICE

(71) Applicant: American Megatrends, Inc., Norcross, GA (US)

(72) Inventor: Clas G. Sivertsen, Lilburn, GA (US)

(73) Assignee: American Megatrends Inc., Norcross, GA (US)

( * ) Notice: Subject to any disclaimer, the term of this patent is extended or adjusted under 35 U.S.C. 154(b) by 163 days.

(21) Appl. No.: 13/741,669

(22) Filed: Jan. 15, 2013

(51) Int. Cl.
*G06F 3/044* (2006.01)

(52) U.S. Cl.
CPC ..................................... *G06F 3/044* (2013.01)

(58) Field of Classification Search
CPC ....... G06F 3/044; G06F 3/041; G06F 3/0412; G06F 3/0416; G06F 3/0488; G06F 2203/04108; G06F 2203/04101; G06F 2230/041; H03K 17/945; H03K 17/955; H03K 17/96; H03K 17/962; H03K 17/967; H03K 2017/96; H03K 2017/94; H03K 2017/945; H03K 2217/945; H03K 2217/96; H03K 2217/9607
See application file for complete search history.

(56) References Cited

U.S. PATENT DOCUMENTS

| 8,294,687 | B1* | 10/2012 | Ksondzyk | 345/173 |
|---|---|---|---|---|
| 8,390,597 | B2* | 3/2013 | Bernstein | 345/174 |
| 8,692,795 | B1* | 4/2014 | Kremin et al. | 345/174 |
| 8,860,682 | B1* | 10/2014 | Kremin et al. | 345/173 |
| 2007/0139379 | A1 | 6/2007 | Kehlstadt et al. | |
| 2008/0122798 | A1 | 5/2008 | Koshiyama et al. | |
| 2008/0277171 | A1 | 11/2008 | Wright | |
| 2008/0297486 | A1* | 12/2008 | Kim et al. | 345/173 |
| 2009/0189867 | A1* | 7/2009 | Krah et al. | 345/173 |
| 2009/0309851 | A1 | 12/2009 | Bernstein | |
| 2010/0134422 | A1* | 6/2010 | Borras | 345/173 |
| 2011/0063224 | A1 | 3/2011 | Vexo et al. | |
| 2011/0149375 | A1* | 6/2011 | Kothari et al. | 359/291 |
| 2011/0261007 | A1 | 10/2011 | Joharapurkar et al. | |
| 2012/0044199 | A1 | 2/2012 | Karpin et al. | |
| 2012/0050216 | A1* | 3/2012 | Kremin et al. | 345/174 |
| 2012/0200531 | A1* | 8/2012 | Araki | 345/174 |

* cited by examiner

*Primary Examiner* — Dwayne Bost
*Assistant Examiner* — Ivelisse Martinez Quiles
(74) *Attorney, Agent, or Firm* — Lee & Hayes, PLLC

(57) ABSTRACT

Multiple reconfigurable hover sensing arrays are utilized to detect the location of an object with respect to a "hover" sensing panel. Multiple enable switches control the size and the shape of the multiple reconfigurable hover sensing arrays. A portion of one of the multiple reconfigurable hover sensing arrays may overlap with another reconfigurable sensing array to improve detection resolution. A scanning and sampling mechanism might also be utilized to assist with controlling the enable switches.

8 Claims, 9 Drawing Sheets

CAPACITANCE SENSING DEVICE

BACKGROUND

Capacitive touch panels are extensively utilized in consumer electronic devices, such as smartphones, tablet computing devices, and keyboards to detect user input gestures. Most of these consumer electronic devices, however, are capable of detecting input gestures within only a limited proximity range. Some previous capacitive touch panels utilize mechanisms for enhancing their detection range by dynamically reconfiguring the size and shape of capacitive touch sensors. Other types of touch panels are configured to enhance their detection range by coupling two or more rows or columns of capacitive sensors to reconfigure the size of capacitive sensor panel. These previous solutions, however, fail to address noise and detection resolution decline issues when multiple capacitive sensor electrodes are integrated.

It is with respect to these and other considerations that the present disclosure has been made.

SUMMARY

The disclosure made herein pertains to a capacitive sensing device that includes a capacitive touch panel, a multitude of capacitive sensor electrodes, and a microcontroller in one particular implementation. According to various embodiments, the microcontroller is configured to define a first "hover" sensing array that includes at least two capacitive sensor electrodes. The term "hover" refers to the placement of a finger or other type of object in proximity to the capacitive sensor electrodes. The capacitive sensor electrodes detect a capacitance change when a finger or another type of object approaches.

The microcontroller may also be configured to define a second hover sensing array that includes two or more of the capacitive sensor electrodes. The second hover sensing array may be defined after the first hover sensing array has been defined. Moreover, at least one capacitive sensor electrode in the first hover sensing array may also be included in the second hover sensing array.

Aspects of the subject matter described herein might be implemented as a computer-implemented method, in a computing system, as an apparatus, or as an article of manufacture such as a computer-readable storage medium. These and various other features as well as advantages will be apparent from a reading of the following detailed description and a review of the associated drawings.

DETAILED DESCRIPTION

Details regarding the various embodiments disclosed herein will now be presented with reference to the accompanying drawings. The disclosure presented herein with regard to the various embodiments is illustrative and is not intended to limit the disclosure to these embodiments. Rather, the disclosure made herein is intended to cover alternatives, modifications and equivalents that may be included without departing from the spirit of the present invention as defined by the claims included herewith. Numerous details are set forth to provide a thorough understanding of various embodiments disclosed herein. Well known methods, techniques, processes, circuits, component parts, structures, or systems obvious to one of the ordinary skill are not further described in detail to avoid unnecessarily obscuring the understanding of the various embodiments presented hereby.

Figure 1A:
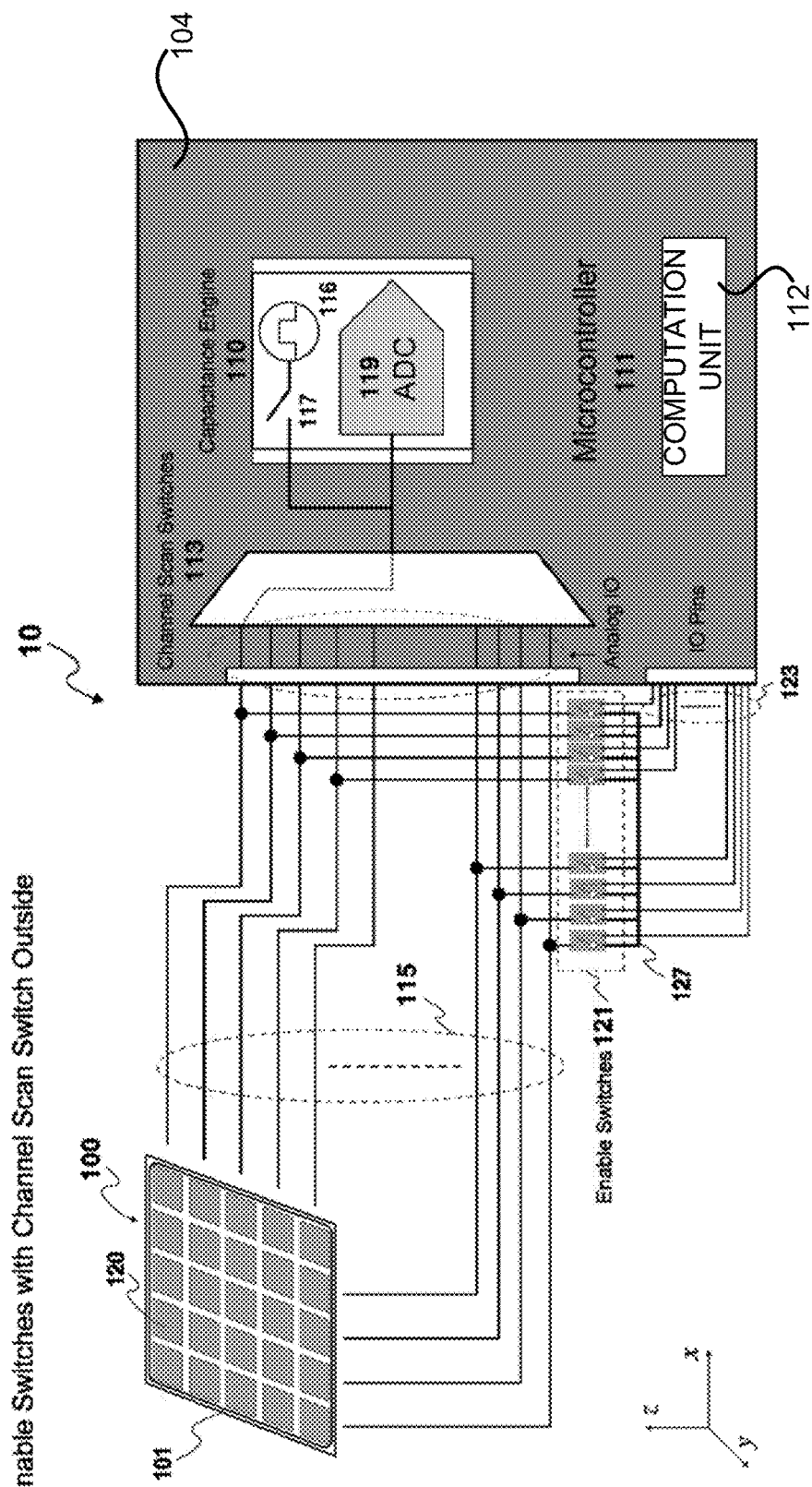
FIGS. 1A-1C are schematic diagrams showing aspects of an exemplary hover sensing system that utilizes multiple capacitive sensor electrodes to detect objects, according to embodiments disclosed herein.

Turning now to FIG. 1A, various aspects of a hover sensing system 10 will be described. As will be discussed in greater detail below, the hover sensing system 10 is configured to detect an object, a user's hovering gesture, or a user's proximity touch. In order to provide this functionality, the hover sensing system 10 includes a hover sensing panel 100 and an electrical component region 104 in one embodiment disclosed herein.

The hover sensing panel 100 includes a substrate 101 and a multitude of capacitive sensor electrodes ("CSE") 120 arranged thereupon. The hover sensing panel 100 can be, but is not limited to, a self-capacitive touch panel. For purposes of discussion herein, the substrate 101 may be considered to be oriented a plane with an X-axis and a Y-axis that are perpendicular to one other, as illustrated in FIG. 1A. The distance between an object and the hover sensing panel 100 may be determined along a Z-axis that is perpendicular to the plane that includes the X-axis and the Y-axis.

The substrate 101 can be a printed circuit board, a transparent board, glass, or another type of planar object made of material upon which the CSE 120 may be affixed. The CSEs 120 can be made of metals or any alternative material, such as copper or indium tin oxide ("ITO"), so long as the material induces a capacitance change when a finger or an object approaches. Accordingly, the hover sensing panel 100 may detect a capacitance change when a finger or an object approaches, which may be referred to herein as "hovering" over the hover sensing panel 100.

The electrical component region 104 includes electrical components, such as a microcontroller 111 and a multitude of enable switches 121. The microcontroller 111 may include a computation unit 112, such as a processor, a central processing unit ("CPU"), or a microprocessor. The computation unit 112 can be any type of computation device configured to execute instructions and to control electrical components in the manner disclosed herein. The computation unit 112 is configured to integrate, or electrically couple, multiple CSE 120 as a reconfigurable hover sensing array 124 (not shown in FIG. 1A), to detect the capacitance change induced by the reconfigurable Hover sensing array 124 when an object or a user's finger is presented, and to determine the location of a finger or an object based on the capacitance change detected. Additional details regarding this process will be provided below.

The microcontroller 111 might also include channel scan switches 113. The channel scan switches 113 allow the microcontroller 111 to detect the capacitance change of each CSE 120. Each CSE 120 is coupled to a channel of channel scan switches 113 respectively via an electrical connection, such as one or more channel lines 115.

In some embodiments, the microcontroller 111 also includes a capacitance engine 110 for sending detection signals and sampling response signals. The capacitance engine 110 includes a detection signal source 116, a detection signal source switch 117, and an analog-to-digital converter ("ADC") 119. The detection signal source 116 sends detection signals to CSE 120 when the detection signal source switch 117 is closed. The ADC 119 samples the response signals from the CSE 120 when the detection signal source switch 117 is open. The response signals sampled by the ADC 119 may be affected when an object or a user's finger induces a capacitance change on the CSE 120, on the reconfigurable hover sensing array 124, or on the hover sensing panel 100.

Each of the enable switches 121 may be opened or closed by the computation unit 112 via an input/output ("I/O") pin and a short circuit control line 123, as shown in FIG. 1A. Each of the enable switches 121 is also coupled to an electrode of a CSE 120, respectively, via the short circuit control lines 123 and the channel lines 115. In addition, of the enable switches 121 is also coupled to the integration bus bar 127 such that when computation unit 112 closes any two enable switches 121, the corresponding two electrodes of the CSE 120 are short circuited, or integrated, via the integration bus bar 127. Accordingly, the existence of the integration bus bar 127 allows the computation unit 112 to define any number of electrodes of the CSE 120 to reconfigure the shape and the size of a reconfigurable hover sensing array 124 by controlling the state of the enable switches 121. In other words, the enable switches 121, along with the integration bus bar 127, enable the reconfiguration of various shapes and sizes of reconfigurable hover sensing arrays 124.

Figure 1B:
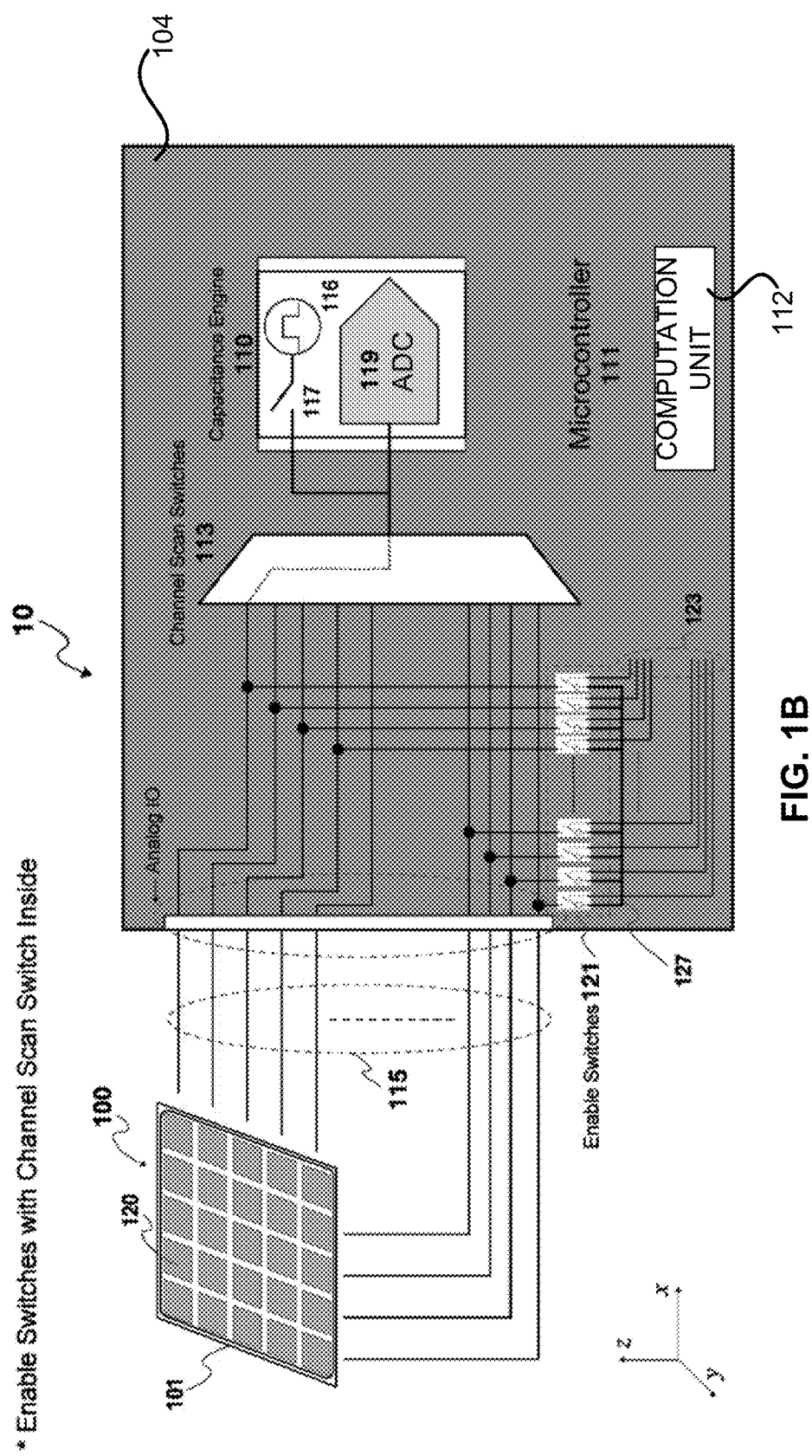
Figure 1C:
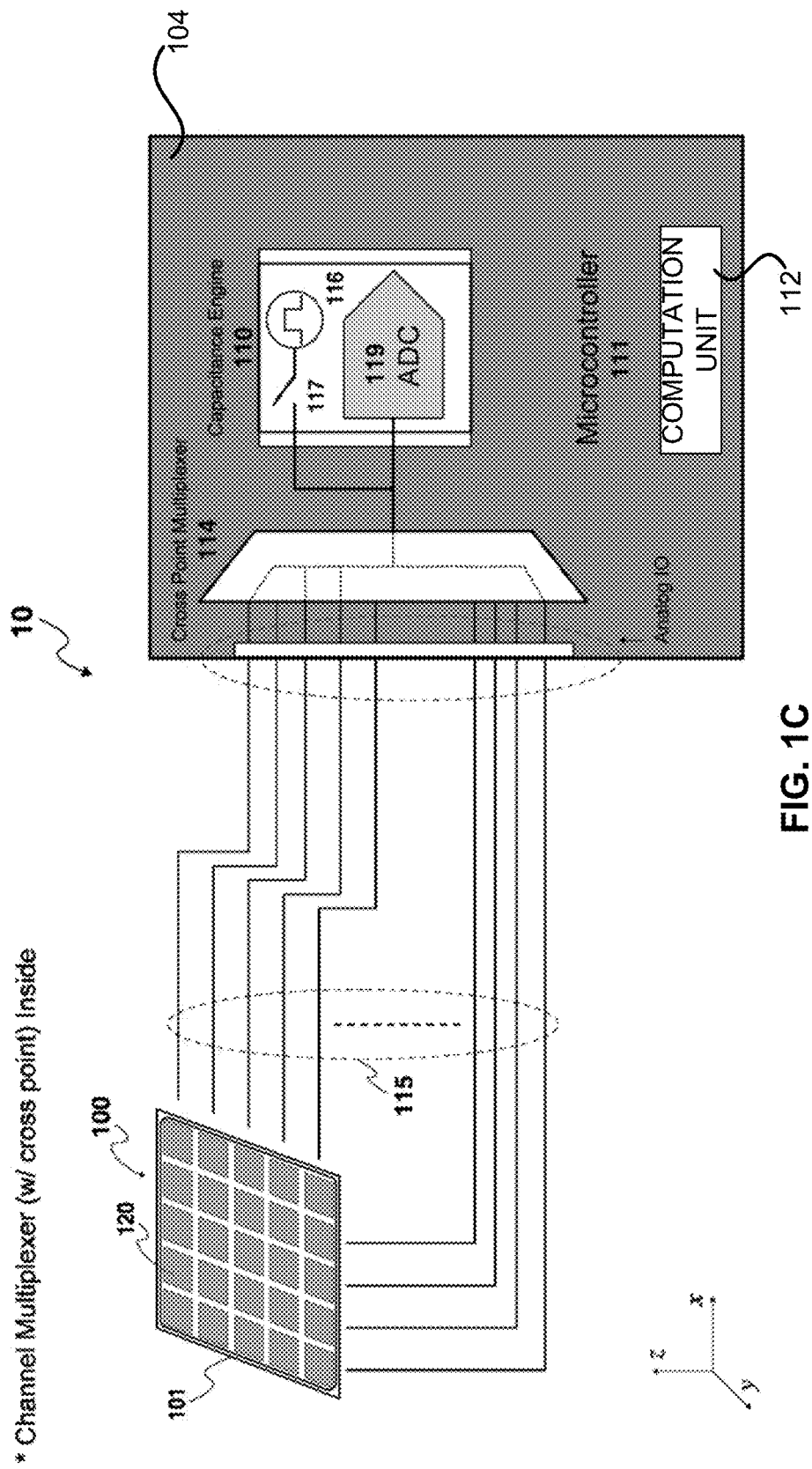

FIG. 1B illustrates another hover sensing system 10 that is configured similarly to the hover sensing system shown in FIG. 1A. In the system 10 of FIG. 1B, however, the enable switches 121 have been integrated with the microcontroller 111. FIG. 1C illustrates a hover sensing system 10 similar to that illustrated in FIG. 1B. In the example shown in FIG. 1C, however, the microcontroller 111 includes a cross point multiplexer 114 that may replace the function of the enable switches 121 and the channel scan switches 113.

The cross point multiplexer 114, the detection signal source 116, the detection signal source switch 117, the ADC 119, and the computation unit 112 may be integrated as an application-specific integrated circuit ("ASIC") microcontroller 111 in some embodiments. Accordingly, the microcontroller 111 may integrate or electrically couple any number of electrodes of the CSE 120.

In some embodiments, the microcontroller 111 may utilize this functionality to reconfigure the shape and the size of reconfigurable hover sensing array 124 when the distance between an object and the hover sensing panel 100 changes. The microcontroller 111 might also determine an object's location with respect to the X-axis and the Y axis of hover sensing panel 100 based on the response signal or capacitance changes induced by the object. One method for performing such a determination is described below with reference to FIG. 5.

Figure 2A:
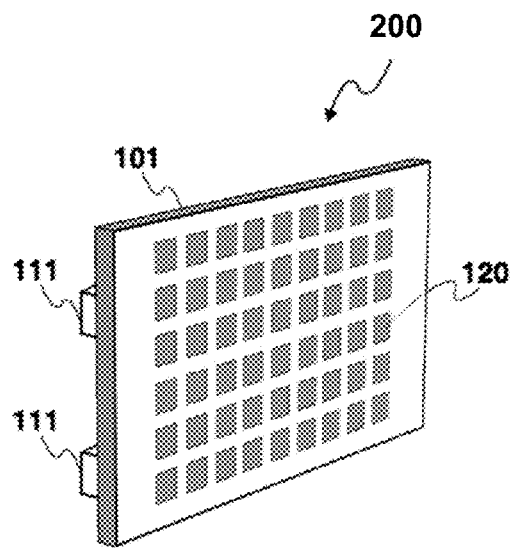
FIGS. 2A-2B are pictorial diagrams showing a side view and a front view, respectively, of a hover input device provided according to one embodiment disclosed herein.
Figure 2B:
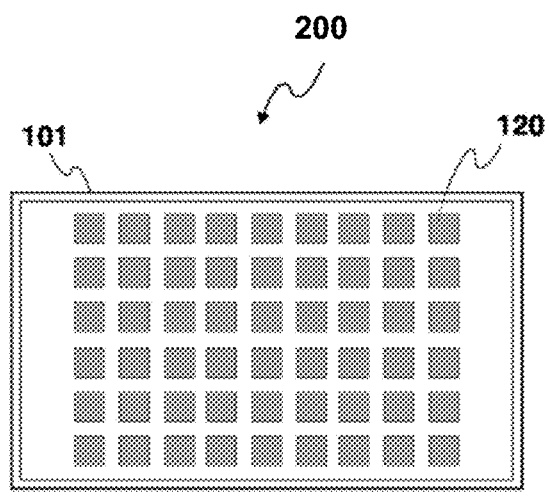

In one embodiment disclosed herein, the hover sensing system 10 is utilized by a hover input device 200 as shown in FIGS. 2A and 2B. In one particular implementation, the CSE 120 are located on one side of the substrate 101 and the microcontroller 111 is located on the other another side of the substrate 101. The hover input device 200 may be a peripheral input device or a device embedded in mobile telephone, notebook, tablet computing device, television ("TV"), smart TV, flat screen display device, or any other type of electronic device that utilizes a user input mechanism.

Figure 3:
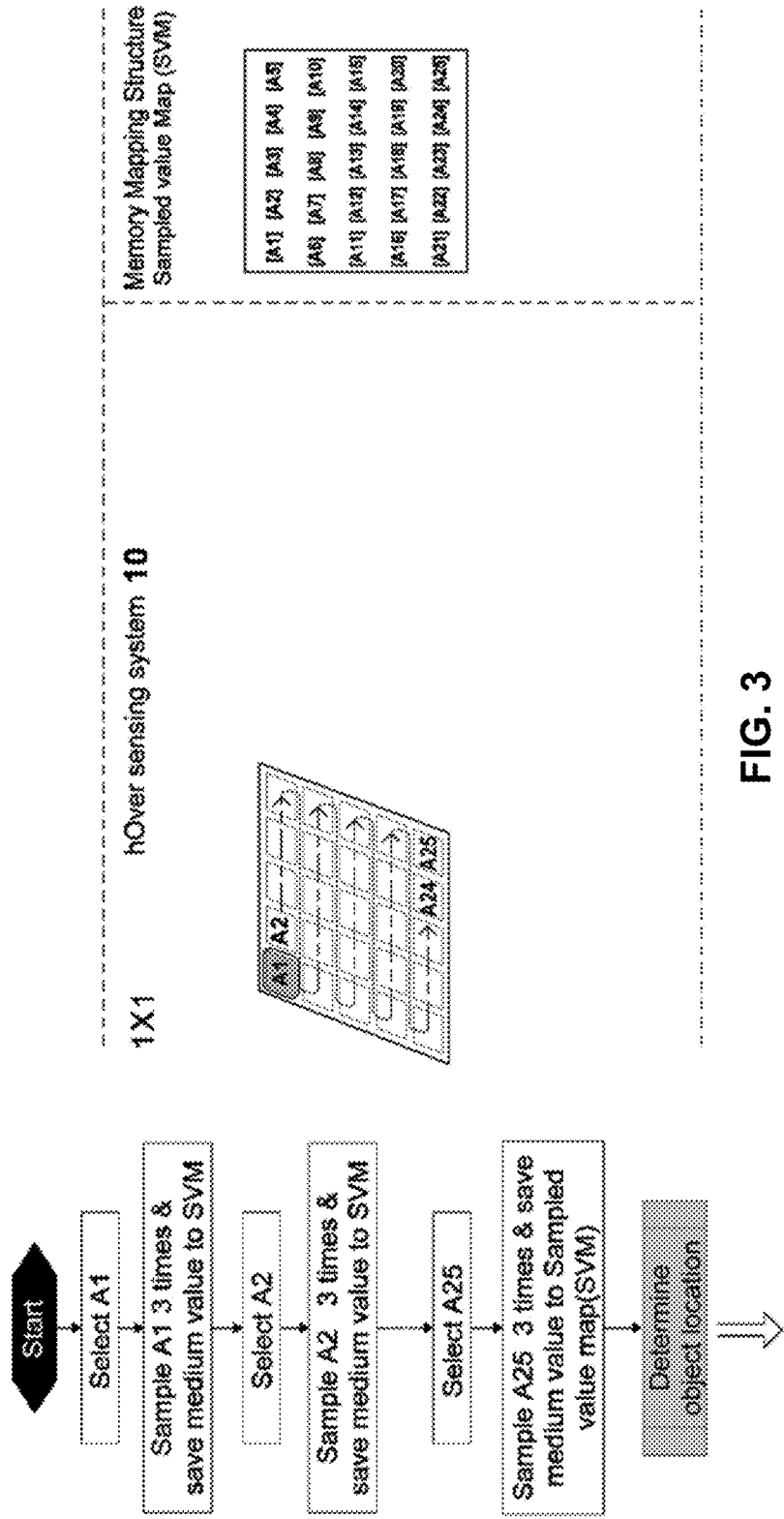
FIG. 3 includes a flow diagram showing aspects of one scanning and sampling method for operating a hover sensing system, according to one embodiment disclosed herein.

FIG. 3 shows aspects of one illustrative mechanism for scanning and sampling to operate the hover sensing system 10. In particular, the microcontroller 111 initially selects a first CSE 120 by controlling the appropriate enable switches 121. For the purpose of illustration, the selected electrode is denoted in FIG. 3 as "A1." The capacitance engine 110 then performs a value sampling action, which sends detection signals to A1, opens detection signal source switch 117, and samples the response signals of A1. The capacitance engine 110 might perform the sampling action multiple times. For example, in one particular example, the capacitance engine 110 repeats the value sampling action three times.

The microcontroller 111 then saves the median value of the three sampled value in a sampled value map ("SVM"). The SVM is a data structure that stores the values sampled from the CSE 120. Repeating the value sampling action multiple times and saving only the median sampled value may help to reduce the influence of noise on the detected signal. Alternatively, three sampled values may be retrieved and the maximum and the minimum of the three sampled values may be discarded. The remaining value may be saved in the SVM. To further reduce the effects of noise, sampling may occur an odd number of times greater than three and the median value of the sampled values may be saved in the SVM.

After the median value has been saved, the microcontroller 111 selects another CSE 120 by controlling the enable switches 121 in the manner described herein. For the purpose of illustration, the selected electrode is denoted as "A2" in FIG. 3. The capacitance engine 110 then performs a value sampling action that sends detection signals to A2, opens the detection signal source switch 117, and samples the response signals. As in the example described above, the capacitance engine 110 may repeat the value sampling action multiple times, such as three times in some implementations. The microcontroller 111 then saves the median value of the three sampled values in the SVM.

Figure 5:
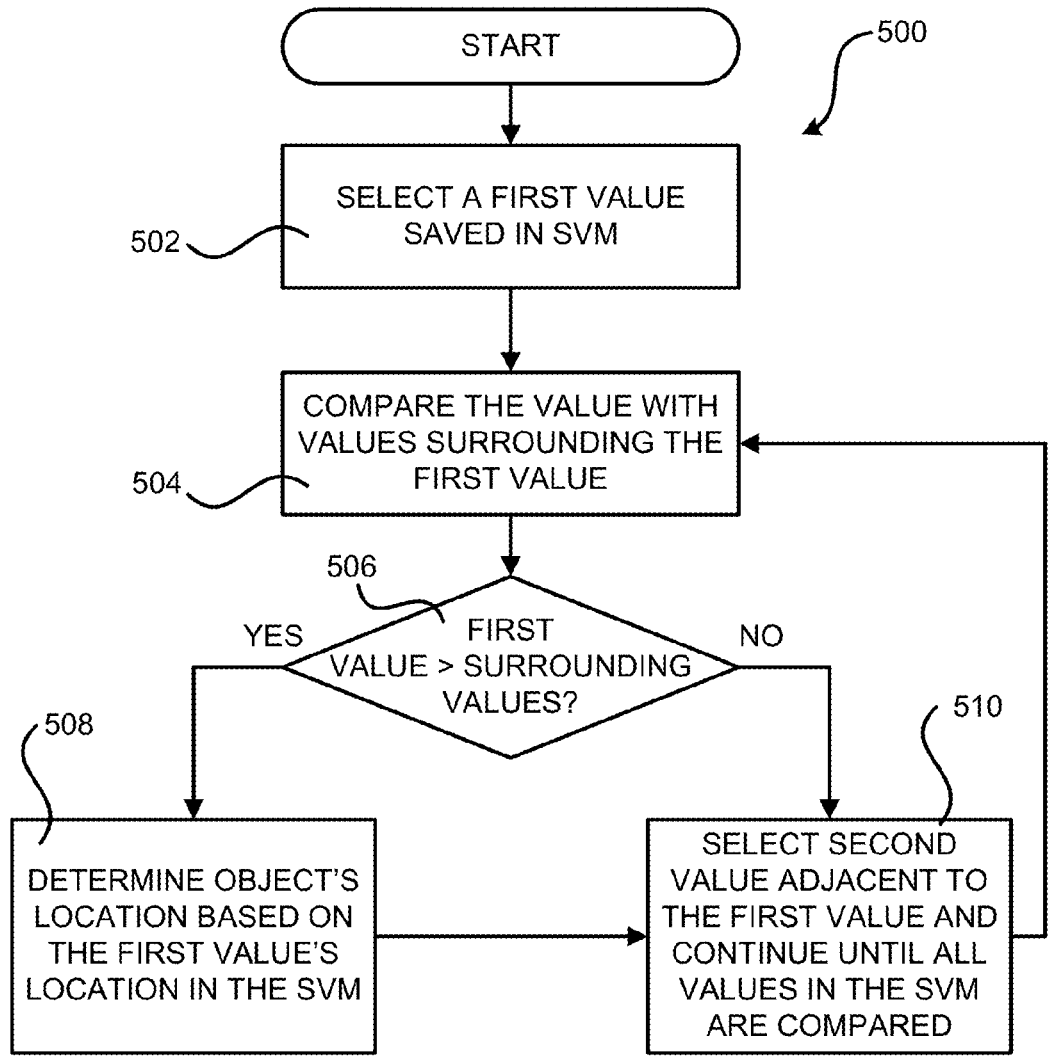
FIG. 5 is a flow diagram showing aspects of one illustrative routing for determining the location of objects based on signals detected by capacitive sensor electrodes arranged in reconfigurable hover sensing arrays, according to embodiments disclosed herein.

The process described above may then be repeated in order to sample values for each of the CSE 120. In this way, the microcontroller 111 creates a SVM having sampled values corresponding to each of the CSE 120. For example, if a 5×5 matrix of CSE 120 is utilized, the procedure described above would create a SVM with sampled values [A1], [A2], . . . [A25], as shown in FIG. 5. As will be described in greater detail below, the location of an object in proximity to the hover sensing system 10 can then be determined utilizing the contents of the SVM.

Figure 4A:
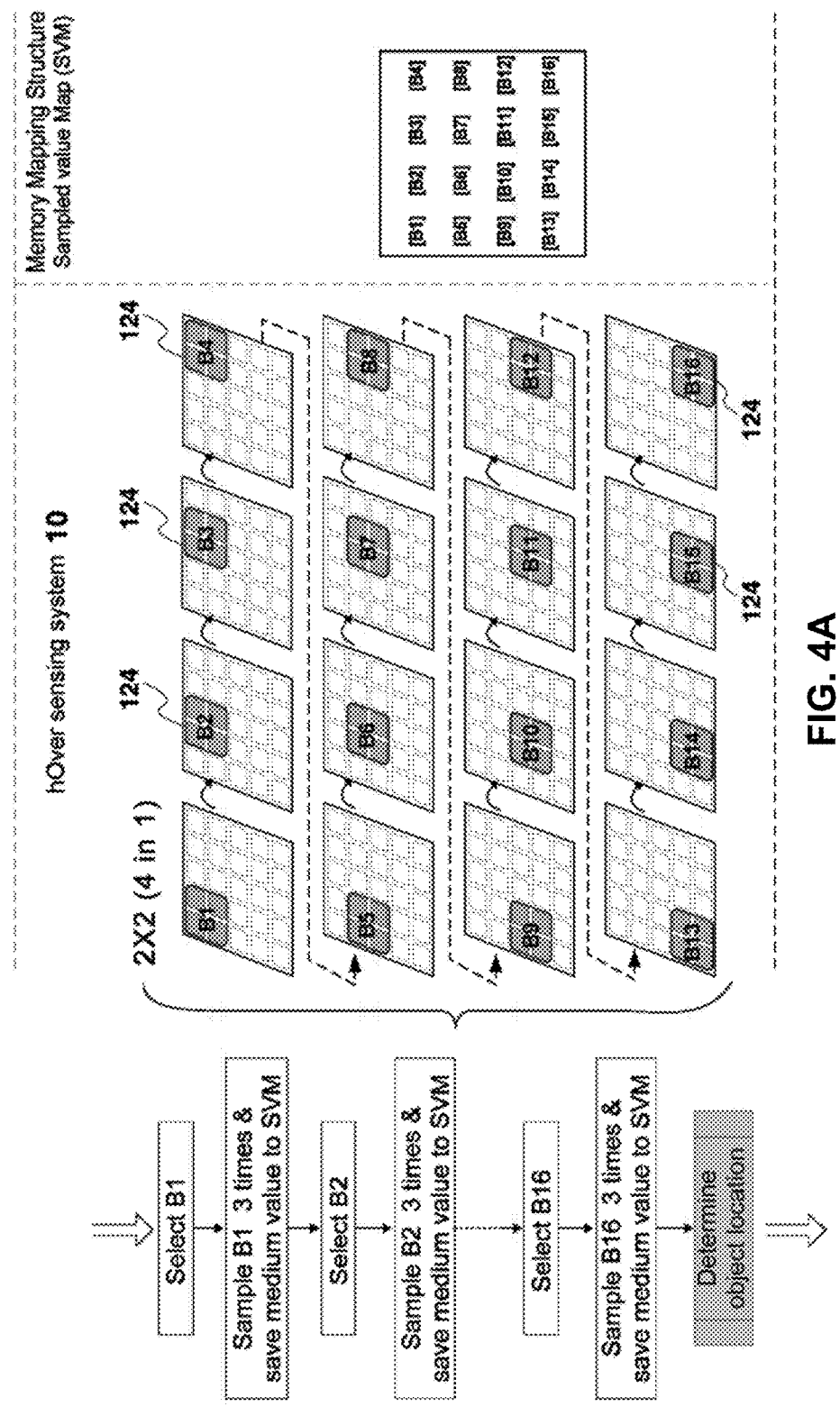
FIGS. 4A-4C include a flow diagrams illustrating aspects of a mechanism for scanning and sampling to detect objects by way of reconfigurable hover sensing arrays, according to embodiments disclosed herein.

FIG. 4A illustrates aspects of another scanning and sampling mechanism utilized by the hover sensing system 10 in another embodiment. In this embodiment, the microcontroller 111 selects and integrates multiple CSE 120 as a first reconfigurable hover sensing array 124 by controlling the enable switches 121 in the manner described above. For the purpose of illustration but not limiting the scope of the disclosure presented herein, the selected CSE 120 may be configured as 2×2 reconfigurable hover sensing array 124, denoted as "B1" in FIG. 4A.

The capacitance engine 110 then performs the value sampling action described above, which sends detection signals to the CSE 120 in B1, opens the detection signal source switch 117, and samples the response signals. The capacitance engine 110 the repeats the value sampling action multiple times. For example, this process might be repeated three times in one particular embodiment. The microcontroller 111 then saves the median value of the sampled values in a SVM. Because each reconfigurable hover sensing array 124 is a 2×2 matrix, the SVM is a 4×4 matrix in this example rather than a 5×5 matrix as described above with regard to FIG. 3.

The microcontroller 111 then selects and integrates another group of CSE 120 as a second 2×2 reconfigurable hover sensing array 124 by controlling the enable switches 121 in the manner described above. For the purpose of illustration, the selected electrodes may be set as a 2×2 reconfigurable hover sensing array 124 denoted as B2 in FIG. 4A.

As shown in FIG. 4A, the physical location of B2 overlaps the physical location of B1 to improve detection resolution. In one specific embodiment, each center of a reconfigurable hover sensing array 124 departs from the center of its adjacent reconfigurable hover sensing array 124 by about the distance between two adjacent CSE 120 among the two reconfigurable hover sensing arrays 124.

The capacitance engine 110 then performs the value sampling action described above, which sends detection signals to B2, opens the detection signal source switch 117, and samples the response signals. The capacitance engine 110 repeats the value sampling action multiple times, such as three times in some embodiments. The microcontroller 111 then saves the median value of the sampled values in the SVM.

The process described above is then repeated for each configuration of the reconfigurable hover sensing array 124. In this way, a value is stored in the SVM corresponding to each reconfigurable hover sensing array 124 selected. For instance, if a 5×5 matrix of CSEs 120 is utilized with a 2×2 reconfigurable hover sensing array 124, this procedure would create a 4×4 SVM with sampled values [B1], [B2], . . . [B16] as shown in FIG. 4A.

As mentioned above, it may be desirable to sample values multiple times immediately after the size and shape of the reconfigurable hover sensing array 124 has been defined. This immediate sampling mechanism is equally applicable to a 2×2 reconfigurable hover sensing array 124 and to reconfigurable hover sensing arrays configured in other sizes. As also mentioned above, each sampled value saved in the SVM corresponds to a physical location of a reconfigurable hover sensing array 124. The physical location of an object can be determined using the values in the SVM. Additional details regarding this process will be provided below with regard to FIG. 5.

Figure 4B:
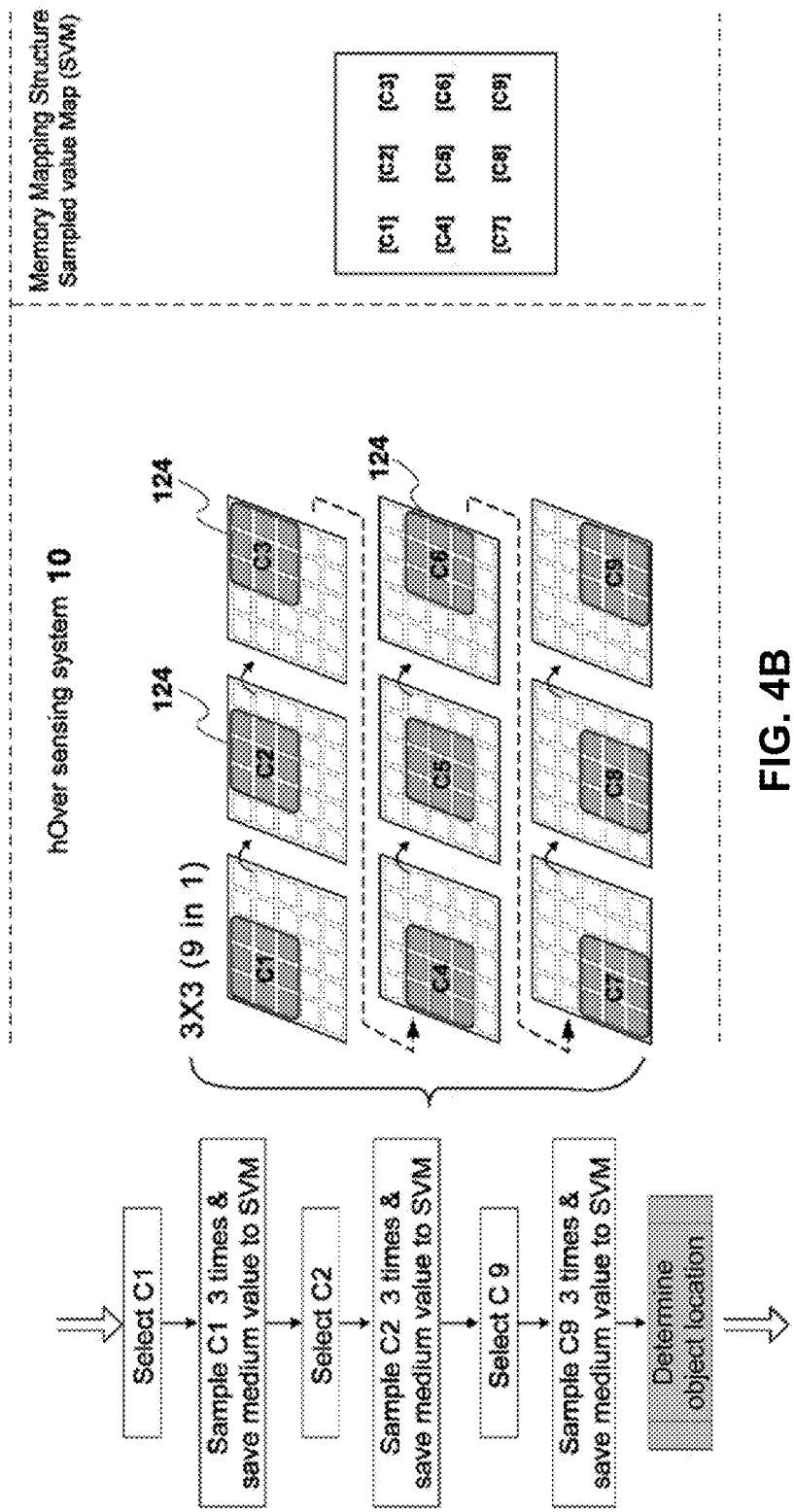
Figure 4C:
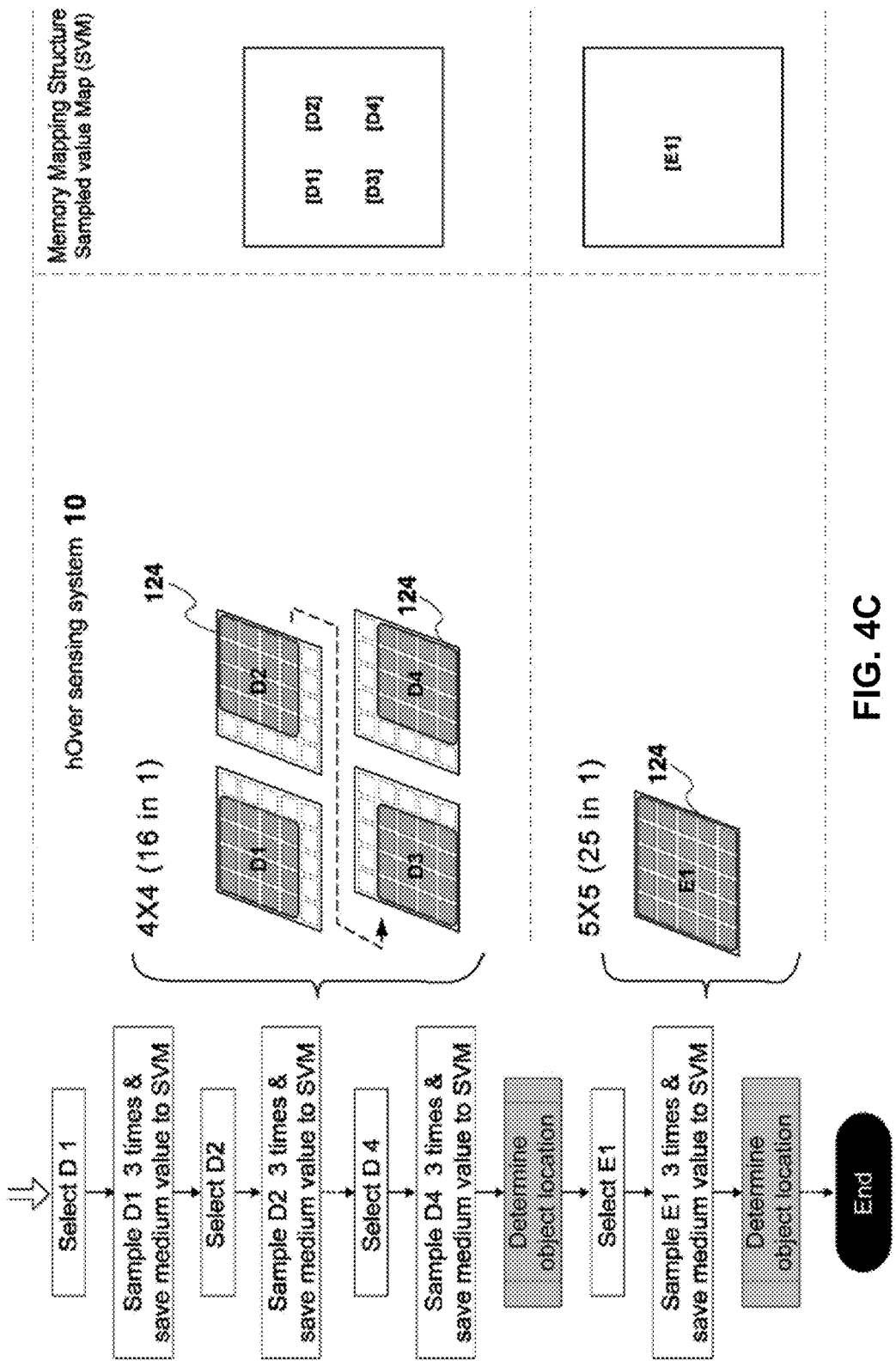

In view of the description provided above, it should be appreciated that the hover sensing array 124 might be configured in various sizes and shapes. For example, the hover sensing array 124 might be configured using a single CSE 120 as shown in FIG. 3, using a 2×2 array of CSEs 120 as shown in FIG. 4A, using a 3×3 array of CSEs 120 as shown in FIG. 4B, or using a 4×4 array of CSEs 120 as shown in FIG. 4C, or using a 5×5 array of CSEs 120 as also shown in FIG. 4C. Other configurations might also be utilized.

As the hover sensing array 124 is moved through various positions on the hover sensing panel 100, SVMs having various configurations of data values may be produced. For example, when a single CSE 120 is utilized, the SVM includes a 5×5 matrix of data values ([A1]-[A25]) as shown in FIG. 3. When a 2×2 array of CSEs 120 is utilized, a 4×4 matrix of values ([B1]-[B16]) is created in the SVM as shown in FIG. 4A. When a 3×3 array of CSEs 120 is utilized, a 3×3 matrix of values ([C1]-[C9]) is created in the SVM as shown in FIG. 4B. When a 4×4 array of CSEs 120 is utilized, a 2×2 matrix of values ([D1]-[D4]) is created in the SVM as shown in FIG. 4C. When a 5×5 array of CSEs 120 is utilized, a single data value ([E1]) is created in the SVM as also shown in FIG. 4C.

The distance at which an object may be detected by the reconfigurable hover sensing array 124 may vary based upon the configuration of the CSEs 120. A 5×5 array of CSEs 120 as shown in FIG. 4C, for example, may be able to detect the presence of an object at a distance further than the 4×4 array of CSEs 120 also shown in FIG. 4C. Similarly, the 4×4 array of CSEs 120 shown in FIG. 4C may be able to detect the presence of an object at a distance further away than the 3×3 array of CSEs 120 shown in FIG. 4B. Likewise, the 3×3 array of CSEs 120 may be able to detect the presence of an object at a distance further than the 2×2 array of CSEs 120 shown in FIG. 4A. Similarly, the 2×2 array of CSEs 120 shown in FIG. 4A may be able to detect the presence of objects at distances further than the single CSE 120 configuration shown in FIG. 3.

In order to determine the location of an object with respect to the X-axis and the Y-axis of hover sensing panel 100, the microcontroller 111 may sample response signals and create values in the SVM utilizing multiple configurations of the CSE 120. For example, the microcontroller might sample response signals using a 1×1 array CSE 120 as shown in FIG. 3, a 2×2 matrix of CSE 120 as shown in FIG. 4A, a 3×3 array of CSE 120 as shown in FIG. 4B, a 4×4 array of CSE 120 as shown in FIG. 4C, and also using a configuration in which all of the CSE 120 are utilized as also shown in FIG. 4C. The various configurations might be sampled in any order. For example, sampling might begin with a single CSE 120 and end with a 5×5 array of CSE 120. In other embodiments, sampling might begin by sampling with a 5×5 array of CSE 120 and end by sampling using a single CSE 120.

As mentioned above, better detection resolution might be achieved when the physical location of each reconfigurable hover sensing array 124 overlaps the physical location of its adjacent reconfigurable hover sensing array 124. In one implementation, for instance, each reconfigurable hover sensing array 124 departs from its adjacent reconfigurable hover sensing array 124 by a distance approximately equal to the distance between two adjacent capacitive sensor electrodes of CSE 120.

When a reconfigurable hover sensing array 124 is selected, the microcontroller 111 might control multiple enable switches 121 to define its shape. Accordingly, a systematical scanning procedure that samples values from one particular reconfigurable hover sensing array 124 to its adjacent reconfigurable hover sensing array 124 may help to reduce the number of switches in need of change. At a minimum, the microcontroller 111 may not have to change the open or close state of the enable switches that control the overlapping portion of the two adjacent reconfigurable hover sensing arrays 124.

Accordingly, in one embodiment disclosed herein, the microcontroller 111 may select another reconfigurable hover sensing array 124 of which a portion overlaps a portion of a previous reconfigurable hover sensing array 124, unless the size or the shape of the reconfigurable hover sensing array 124 is changed. In some embodiments, each reconfigurable hover sensing array 124 is the same size, although present in a different physical location, with its adjacent reconfigurable hover sensing arrays 124 during the procedure of creating the SVM. In addition, the sampling procedure will not shift to the next line of channel lines 115 in some embodiments until all the detection signals of a reconfigurable hover sensing array 124 along the line are sampled.

Turning now to FIG. 5, a flow diagram will be described that shows one illustrative routine 500 for determining the location of objects based on signals generated by the CSE 120 or reconfigurable hover sensing arrays 124, according to one embodiment disclosed herein. It should be appreciated that the logical operations described herein with respect to FIG. 5 and the other figures may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 500 begins at operation 502, where the microcontroller 111 selects a first value saved in the SVM. The routine 500 then proceeds to operation 504, where the microcontroller 111 compares the first value with other values that surround the first value in the SVM. If the first value is greater than the surrounding values, the routine 500 proceeds from operation 506 to operation 508. If the first value is not greater than the surrounding values in the SVM, the routine 500 proceeds from operation 506 to operation 508.

At operation 508, the microcontroller 111 determines the location of a proximate object based on the first value's location with respect to other values in the SVM. Because the locations of saved values in the SVM each corresponds to a physical location of the respective CSE 120 or reconfigurable hover sensing array 124, the location of the object with respect to the hover sensing panel 100 can be determined. From operation 508, the routine 500 proceeds to operation 510.

At operation 510, the microcontroller 111 selects a second value adjacent to the first value selected at operation 502. The routine 500 then returns back to operation 504, described above, until all values saved in the SVM have been compared in the manner described above. Following the completion of the object location determination procedure shown in FIG. 5, the location of one or multiple objects in the X-Y plane of hover sensing panel 100 will have been determined. It should be appreciated that the same or similar determination procedure may be utilized with various shapes and sizes of reconfigurable hover sensing arrays 124, of which the shape and the size are reconfigured in corresponding to various object distances estimated from the hover sensing panel 100 along the Z-axis.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A capacitance sensing device including:
   a capacitive touch panel;
   a plurality of capacitive sensor electrodes; and
   a microcontroller configured to
   create values in sampled value map (SVM) by consecutively sampling signals generated by single ones of the capacitive sensor electrodes;
   create values in the SVM by consecutively sampling signals generated by overlapping 2×2 matrices of the capacitive sensor electrodes;
   create values in the SVM by consecutively sampling signals generated by overlapping 3×3 matrices of the capacitive sensor electrodes;
   create values in the SVM by consecutively sampling signals generated by overlapping 4×4 matrices of the capacitive sensor electrodes; and
   create values in the SVM by sampling signals generated by each of the plurality of capacitive sensor electrodes.

2. The capacitive sensing device of claim 1, wherein the microcontroller is further configured to:
   sample the signals generated by the capacitive sensor electrodes a plurality of times.

3. The capacitive sensing device of claim 2, wherein the microcontroller is further configured to record a median value of the sampled signals in the sampled value map (SVM).

4. The capacitance sensing device of claim 1, wherein the plurality of capacitive sensor electrodes is located on a first side of the capacitive touch panel, and wherein the microcontroller is located on a second side of the capacitive touch panel.

5. The capacitance sensing device of claim 4, wherein the microcontroller further comprises a capacitance engine for transmitting detection signals and sampling response signals of the detection signals.

6. A method of detecting a location of an object with respect to a capacitive touch panel, the method comprising:
   providing multiple capacitive sensor electrodes in conjunction with the capacitive touch panel; and
   configuring a microcontroller to:
   create values in a sampled value map (SVM) by consecutively sampling signals generated by single ones of the capacitive sensor electrodes,
   create values in the SVM by consecutively sampling signals generated by overlapping 2×2 matrices of the capacitive sensor electrodes,
   create values in the SVM by consecutively sampling signals generated by overlapping 3×3 matrices of the capacitive sensor electrodes,
   create values in the SVM by consecutively sampling signals generated by overlapping 4×4 matrices of the capacitive sensor electrodes,
   create values in the SVM by sampling signals generated by each of the plurality of capacitive sensor electrodes, and
   detect the location of the object using the SVM.

7. The method of claim 6, wherein the microcontroller is further configured to:
   sample signals generated by the capacitive sensing electrodes three times.

8. The method of claim 7, wherein the microcontroller is further configured to:
   save a median value of the sampled signals in the sampled value map (SVM).

* * * * *